(12) United States Patent
Suwazono et al.

(10) Patent No.: US 9,444,295 B2
(45) Date of Patent: Sep. 13, 2016

(54) ROTOR OF PERMANENT MAGNET MOTOR

(71) Applicant: MEIDENSHA CORPORATION, Tokyo (JP)

(72) Inventors: Takeshi Suwazono, Tokyo (JP); Yoshiharu Naito, Tokyo (JP); Sho Uchiyama, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 25 days.

(21) Appl. No.: 14/426,522

(22) PCT Filed: Sep. 9, 2013

(86) PCT No.: PCT/JP2013/074259
§ 371 (c)(1),
(2) Date: Mar. 6, 2015

(87) PCT Pub. No.: WO2014/038695
PCT Pub. Date: Mar. 13, 2014

(65) Prior Publication Data
US 2015/0236556 A1 Aug. 20, 2015

(30) Foreign Application Priority Data

Sep. 7, 2012 (JP) .................. 2012-196776

(51) Int. Cl.
*H02K 1/27* (2006.01)
(52) U.S. Cl.
CPC .................... *H02K 1/276* (2013.01)
(58) Field of Classification Search
CPC ...... H02K 1/276; H02K 1/27; H02K 1/2753; H02K 1/274; H02K 1/2726; H02K 1/272
USPC ............ 310/156.53, 156.57, 156.56, 156.55, 310/156.48
See application file for complete search history.

(56) References Cited

U.S. PATENT DOCUMENTS

| | | | |
|---|---|---|---|
| 6,008,559 A | 12/1999 | Asano et al. | |
| 2002/0171309 A1* | 11/2002 | Wakui | H02K 1/276 310/156.57 |
| 2010/0052455 A1* | 3/2010 | Feng | H02K 1/276 310/156.08 |

FOREIGN PATENT DOCUMENTS

| | | |
|---|---|---|
| EP | 1 855 370 A1 | 11/2007 |
| JP | 11-98731 A | 4/1999 |

(Continued)

OTHER PUBLICATIONS

European Search Report, Mar. 23, 2016, 8 pages.

(Continued)

*Primary Examiner* — Michael Andrews
(74) *Attorney, Agent, or Firm* — Foley & Lardner LLP

(57) ABSTRACT

In this rotor (101), which has permanent magnets (105) inserted in a rotor core (102), main body sections (117) of magnetic shield sections (107) are formed in contact with the q-axis-side end faces (105*q*) of each permanent magnet (105). In addition, an extension section (127) for each magnetic shield section (107) is formed positioned more toward the outer periphery than the outer-periphery-side pole face (105*ou*) of the permanent magnet (105) and between the d-axis and the q-axis at an end face of the rotor core (102). Each extension section (127) is configured so as to gradually approach the outer periphery of the rotor core (102) while extending from the outer-periphery-side end of the main body section (117) from the q-axis to the d-axis side, and then gradually move away from the outer periphery of the rotor core (102) while extending from the q-axis side to the d-axis side.

7 Claims, 9 Drawing Sheets

(56) References Cited

FOREIGN PATENT DOCUMENTS

| | | |
|---|---|---|
| JP | 2000-278896 A | 10/2000 |
| JP | 2002-354727 A | 12/2002 |
| JP | 2006-238678 A | 9/2006 |
| JP | 2009-50138 A | 3/2009 |

OTHER PUBLICATIONS

Japanese Office Action, Dec. 2, 2014, 5 pages.

* cited by examiner

ROTOR OF PERMANENT MAGNET MOTOR

TECHNICAL FIELD

The present invention relates to a rotor of a permanent magnet motor which is devised to reduce cogging torque and torque ripples while securing mechanical strength.

BACKGROUND ART

A rotor of a permanent magnetic motor of embedded magnet type (IPM motor: Interior Permanent Magnet motor) is configured in that permanent magnets are embedded into a rotor core.

In such an interior permanent magnet motor, both of magnet torque generated by magnetic fluxes of the permanent magnets and reluctance torque generated through changes in magnetic resistances (reluctances) of the rotor core can be utilized as effective torque that contributes to rotating force. An interior permanent magnet motor is accordingly a motor of energy-saving type, of high efficiency and of high torque, and is used in various industrial fields.

Cogging torque or torque ripples including such cogging torque are generated in an interior permanent magnet motor. For reducing such cogging torque and torque ripples, it is suggested to form magnetic shielding portions (details will be described later) at a rotor of a permanent magnet motor (see, for instance, Patent Literature 1).

A prior art case in which cogging torque and torque ripples are reduced by forming magnetic shielding portions at a rotor of a permanent magnet motor will now be explained with reference to FIG. 8.

In this respect, only a portion of one main magnetic pole is shown in FIG. 8, and since the other magnetic poles are of identical configuration as that of the main magnetic pole shown in FIG. 8, illustrations thereof are omitted.

Further, in FIG. 8, lines of magnetic forces showing magnetic flux flows are indicated by dotted lines.

FIG. 8 is a sectional view orthogonal to an axial direction in which a conventional rotor 1 used in an interior permanent magnet motor is shown upon extracting only a portion of one main magnetic pole.

As shown in the drawing, a rotor core 2 of the rotor 1 is a substantially cylindrically shaped member formed by laminating silicon steel plates. A motor shaft 3 is fitted into an axial core portion of the rotor core 2, and the motor shaft 3 is supported by a bearing (illustration omitted) in a freely rotatable manner.

A permanent magnet inserting hole 4 is a hole which penetrates in the axial direction from one end surface up to the other end surface of the rotor core 2. The permanent magnet inserting holes 4 are formed at the rotor core 2 at even intervals along a peripheral direction.

A plate-like permanent magnet 5 is inserted into the permanent magnet inserting hole 4 to form a single main magnetic pole. Magnetic polarities of the permanent magnets 5 are set for each of the main magnetic poles such that an outer peripheral side magnetic pole surface 5*ou*, of a permanent magnet 5 disposed to have an arbitrary main magnetic pole and an outer peripheral side magnetic pole surface 5*ou*, of a permanent magnet 5 disposed at a main magnetic pole adjoining the main magnetic pole have mutually different magnetic polarities. With this arrangement, magnetic polarities of adjoining main magnetic poles (S poles, N poles) will be different from each other.

In the rotor core 2 of the rotor 1, an axis connecting the axial core of the rotor 1 (motor shaft 3) and a center of an arbitrary main magnetic pole generating magnetic torque (a central position in a peripheral direction of the permanent magnet 5) will be a d axis of a d-q axial coordinate.

Further, from among the rotor core 2, a core between an arbitrary main magnetic pole and a main magnetic pole adjoining the main magnetic pole in the peripheral direction will be an auxiliary magnetic pole portion 6 generating reluctance torque. An axis connecting the axial core of the rotor 1 (motor shaft 3) and a central axis of the auxiliary magnetic pole 6, namely an axis orthogonal to the d axis at an electrical angle will be a q axis of the d-q axial coordinate.

Further, the rotor core 2 is formed with a magnetic shielding portion 7 which is a hole penetrating in the axial direction from one end surface up to the other end surface. The magnetic shielding portion 7 is located between the d axis and the q axis of the d-q axial coordinate at an end surface of the rotor core 2. In the example of FIG. 8, two magnetic shielding portions 7 are formed at an arbitrary magnetic pole.

Explaining the shape and the configuration of the magnetic shielding portion 7 with reference to FIG. 9, the magnetic shielding portion 7 is constituted of a main body portion 17 and an extending portion 27 succeeding to (communicating with) the main body portion 17.

The main body portion 17 contacts a q-axis side end surface 5*q*, which is an end surface of the permanent magnet 5 in the peripheral direction (succeeds to (communicates with) the permanent magnet inserting hole 4) and extends towards the outer peripheral surface of the rotor 1 from its axial core side portion 17-1 towards an outer peripheral side portion 17-2. However, the outer peripheral side portion 17-2 of the main body portion 17 does not reach the outer peripheral surface of the rotor 1 and the rotor core 2 resides between the outer peripheral side portion 17-2 and the outer peripheral surface of the rotor 1.

The extending portion 27 is arranged in that its base end portion 27-1 succeeds to (communicates with) the outer peripheral side portion 17-2 of the main body portion 17 and extends from the outer peripheral side portion 17-2 of the main body portion 17 along the circumferential direction towards the d axis. However, a tip end portion 27-2 of the extending portion 27 does not reach the d runs. A distance between the extending portions 27 and the outer peripheral surface of the rotor 1 (distance in the radial direction) is substantially constant at any position in the extending direction of the extending portion 27, and the rotor core 2 resides between the extending portion 27 and the outer peripheral surface of the rotor 1.

Since the magnetic shielding portion 7 is a hole (space), its magnetic permeability is remarkably smaller than that of the rotor core 2, and since it is extremely hard for the magnetic flux to pass therethrough, it functions as a magnetic shielding portion. In this respect, also when the interior of the hole (space) forming the magnetic shielding portion 7 is filled with a non-magnetic metal of low magnetic permeability (such as aluminum or brass), adhesive, varnish or resin, it is still a magnetic shielding portion.

Since such a magnetic shielding portion 7 is formed on end surfaces on both sides of the permanent magnet 5 in the peripheral direction, it has the following effects.

(1) Since the magnetic shielding portions 7 for magnetically shielding a space between an arbitrary main magnetic pole and a main magnetic pole adjoining the main magnetic pole in the peripheral direction, it is possible to reduce magnetic flux (short-circuit flux) which is generated from the outer peripheral side magnetic pole surface 5ou, of the permanent magnet 5 of the main magnetic pole, passes the auxiliary magnetic pole portion 6 of the rotor core 2 and reaches the outer peripheral side magnetic pole surface 5ou, of the permanent magnet 5 of the main magnetic pole adjoining in the peripheral direction. Since the short-circuit flux is a torque which does not cross a stator and does not contribute to generation of magnetic torque, the effective torque is increased by decreasing such short-circuit flux.

As for the reduction of the short-circuit flux, the shorter the distance between the extending portion 27 of the magnetic shielding portion 7 and the outer peripheral surface of the rotor 1 (distance in the radial direction) is and the longer the length of the extending portion 27 along the circumferential direction is, the more generation of short-circuit flux can be restrained.

(2) Since the magnetic flux generated from the outer peripheral side magnetic pole surface 5ou, of the permanent magnet 5 passes while bypassing towards a central side of the permanent magnet 5 so as to go round the magnetic shielding portion 7 of low magnetic permeability, changes in magnetic flux density distribution generated on the outer peripheral surface of the rotor 1 will become moderate by means of the permanent magnet 5. More specifically, changes in magnetic flux density distribution will become moderate at both end portions of the main magnetic pole in the peripheral direction.

In this manner, since especially changes at both end portions of the main magnetic pole in the peripheral direction from among the magnetic flux density distribution generated on the outer peripheral surface of the rotor 1 will become moderate, it is possible to reduce cogging torque and torque ripples.

CITATION LIST

Patent Literature

PTL 1: Japanese Patent Application Laid-Open No. Hei. 11-98731

SUMMARY OF INVENTION

Technical Problem

The above prior art had the following problems.

(1) The rotor 1 of the permanent magnet motor is arranged in that the distance between the extending portion 27 of the magnetic shielding portion 7 and the outer peripheral surface of the rotor 1 (distance in the radial direction) is made short and the length of the extending portion 27 along the circumferential direction is made large for restraining generation of short-circuit flux. With this arrangement, the rotor core 2 positioned between the extending portion 27 and the outer peripheral surface of the rotor 1 will have a small radial directional distance and a long peripheral directional length, and its mechanical strength will become small. Accordingly, it might be that the motor cannot stand centrifugal force when rotated at high speed.

The rotor core 2 is configured by laminating silicon steel plates and forming the magnet inserting holes 4 and the magnetic shielding portions 7 or the like through punching. Accordingly. when the distance between the extending portion 27 of the magnetic shielding portion 7 and the outer peripheral surface of the rotor 1 (distance in the radial direction) is made short and the length of the extending portion 27 along the circumferential direction is made long, the rotor core 2 positioned between the extending portion 27 and the outer peripheral surface of the rotor 1 will have a small mechanical strength as mentioned above so that problems will be caused in performing punching. Namely, when performing punching of the silicon steel plates, the rotor core 2 positioned between the extending portion 27 and the outer peripheral surface of the rotor 1 is easily distorted and even cut in the worst case so that manufacture of the rotor core 2 might become difficult.

(2) In these days, it is desired to further reduce cogging torque and torque ripples for smoothly driving the motor and for reducing noise and oscillation. However, the above-mentioned prior art could not meet the demands of further reducing cogging torque and torque ripple.

The present invention has been made in view of the above prior art, and it is an object thereof to provide a rotor of a permanent magnet motor capable of improving mechanical strength by reducing centrifugal force at the time of high speed rotation of the permanent magnetic motor and difficulties of manufacture and of additionally reducing cogging torque and torque ripples.

Solution to Problems

The configuration of the present invention for solving the above problems is characterized in that it is a rotor of a permanent magnetic motor formed with a plurality of main magnetic poles along a peripheral direction of a rotor core by respectively comprising permanent magnets in permanent magnet inserting holes formed at a plurality of spots in a peripheral direction of the rotor core to penetrate in an axial direction from one end surface up to the other end surface of the rotor core, and formed with magnetic shielding portions for each main magnetic pole which penetrate in the axial direction from the one end surface up to the other end surface of the rotor core and which are positioned between a d axis and a q axis of a d-q axial coordinate on the end surface of the rotor core, wherein each magnetic shielding portion includes an extending portion, wherein the extending portion is formed closer to an outer peripheral side than an outer peripheral side magnetic pole surface of the permanent magnet, and wherein the extending portion also extends from the q axis side towards the d axis side and gradually separates from the outer peripheral surface of the rotor core while extending from the q axis side towards the d axis side.

The configuration of the present invention is characterized in that it is a rotor of a permanent magnetic motor formed with a plurality of main magnetic poles along a peripheral direction of a rotor core by respectively comprising permanent magnets in permanent magnet inserting holes formed at a plurality of spots in a peripheral direction of the rotor core to penetrate in an axial direction from one end surface up to the other end surface of the rotor core, and formed with magnetic shielding portions for each main magnetic pole which penetrate in the axial direction from the one end surface up to the other end surface of the rotor core and which are positioned between a d axis and a q axis of a d-q axial coordinate on the end surface of the rotor core, wherein each magnetic shielding portion includes a main body portion and an extending portion succeeding to the main body portion, wherein the main body portion is formed at a position opposing a q axis side end surface of the permanent magnet, wherein the main body portion also extends towards an outer peripheral surface of the rotor core, wherein the extending portion is formed closer to an outer peripheral side than an outer peripheral side magnetic pole surface of the permanent magnet, and wherein the extending portion also extends from the q axis side towards the d axis side with the outer peripheral side portion of the main body being the starting point and gradually separates from the outer peripheral surface of the rotor core while extending from the q axis side towards the d axis side.

The configuration of the present invention is characterized in that the extending portion has a bent shape being bent halfway while extending from the q axis side towards the d axis side or the extending portion has a warped shape being warped while extending from the q axis side towards the d axis side.

The configuration of the present invention is characterized in that the main body portion contacts the q axis side end surface or the main body portion separates from the q axis side end surface.

Advantageous Effects of Invention

According to the present invention, each extending portion of the magnetic shielding portion is arranged in that it is formed closer to the outer peripheral side than the outer peripheral side magnetic pole surface of the permanent magnet, and in that the extending portion also extends from the q axis side towards the d axis side and gradually separates from the outer peripheral surface of the rotor core while extending from the q axis side towards the d axis side.

With this arrangement, it is possible to make changes in magnetic flux density distribution generated on the outer peripheral surface of the rotor by means of the permanent magnet, and especially the magnetic flux density distributions at both end portions of the main magnetic pole in the peripheral direction to be more moderate when compared to the prior art, to make the magnetic flux density distribution generated from the main magnetic pole to be closer to a sine wave, and to reduce cogging torque and torque ripples in a more effective manner.

At a position of an extensional end point of the extending portion (portion close to the d axis), the distance between the extending portion and the rotor core (distance in the radial direction) will be long so that it is possible to secure mechanical strength of the rotor core which also makes processing easy.

DESCRIPTION OF EMBODIMENTS

The rotor of a permanent magnet motor according to the present invention will be explained in details based on examples thereof.

EXAMPLE 1

A rotor 101 of a permanent magnet motor according to Example 1, of the present invention will now be explained with reference to FIG. 1.

Figure 1:
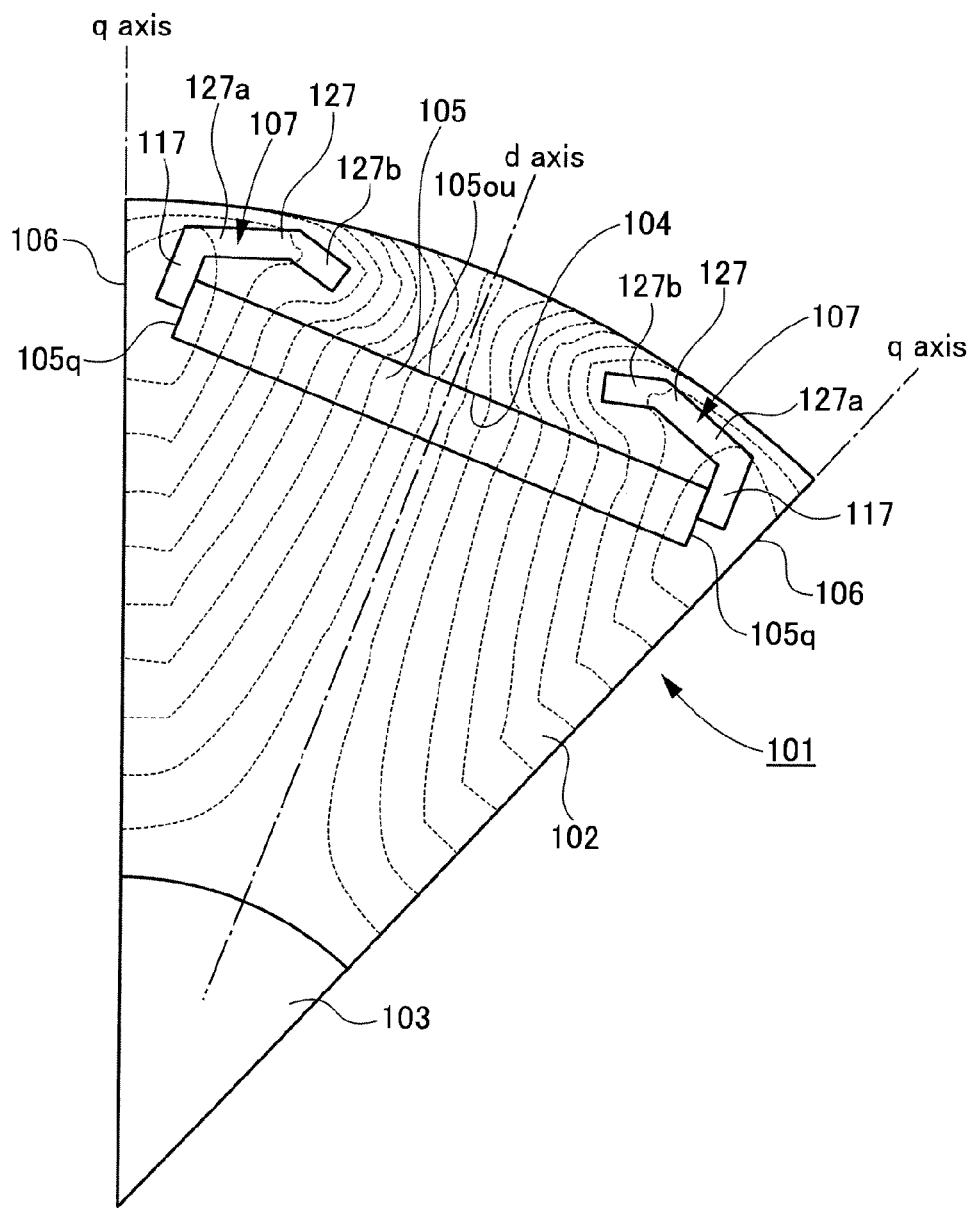
FIG. 1 is a sectional view orthogonal to an axial direction showing a rotor of a permanent magnet motor according to Example 1, of the present invention.

In this respect, only one main magnetic pole is shown in FIG. 1, and since the other main magnetic poles are of identical configuration as that of the main magnetic pole shown in FIG. 1, illustration of the other main magnetic poles is omitted.

Further, in FIG. 1, lines of magnetic forces showing magnetic flux flows are indicated by dotted lines.

FIG. 1 is a sectional view orthogonal to the axial direction showing the rotor 101 of Example 1, used in an interior permanent magnet motor upon extracting only one main magnetic pole.

As shown in the drawing, a rotor core 102 of the rotor 101 is a substantially cylindrical member formed by laminating silicon steel plates. A motor shaft 103 is fitted into an axial core portion of the rotor core 102, and the motor shaft 103 is supported by a bearing (illustration omitted) in a freely rotatable manner.

A permanent magnet inserting hole 104 is a hole which penetrates from one end surface up to the other end surface of the rotor core 102 in the same direction as the motor shaft 103. The permanent magnet inserting holes 104 are formed at the rotor core 102 at even intervals in a peripheral direction of the rotor core 102.

In this example, a plate-like permanent magnet 105 is inserted into the permanent magnet inserting hole 104 to form a single main magnetic pole. Magnetic polarities of the permanent magnets 105 are set for each main magnetic poles such that an outer peripheral side magnetic pole surface 105*ou*, of a permanent magnet 105 disposed at an arbitrary main magnetic pole and an outer peripheral side magnetic pole surface 105*ou*, of a permanent magnet 105 disposed at a main magnetic pole adjoining the main magnetic pole have mutually different magnetic polarities. With this arrangement, magnetic polarities of adjoining main magnetic poles (S poles, N poles) will be different from each other.

In this manner, a plurality of main magnetic poles with alternatively different magnetic polarities is formed at the rotor 101 along the peripheral direction of the rotor core 102.

In the rotor core 102 of the permanent magnet motor shown in FIG. 1, an axis connecting the axial core of the rotor 101 (motor shaft 103) and a center of an arbitrary main magnetic pole generating magnetic torque (a central position in a peripheral direction of the permanent magnet 105) will be a d axis of a d-q axial coordinate.

Further, from among the rotor core 102, the core between a permanent magnet 105 of one main magnetic pole corresponding to one magnetic pole and a permanent magnet 105 of a main magnetic pole adjoining the main magnetic pole in the peripheral direction will be an auxiliary magnetic pole portion 106 generating reluctance torque. An axis connecting the axial core of the rotor 101 (motor shaft 103) and a central axis of the auxiliary magnetic pole 106, namely an axis orthogonal to the d axis at an electrical angle will be a q axis of the d-q axial coordinate.

Further, the rotor core 102 is formed with a magnetic shielding portion 107 which is a hole penetrating from one end surface up to the other end surface in the same direction as the motor shaft 103. The magnetic shielding portion 107 is positioned between the d axis and the q axis of the d-q axial coordinate at an end surface of the rotor core 102. In the example of FIG. 1, two magnetic shielding portions 107 are formed at one main magnetic pole.

Figure 2:
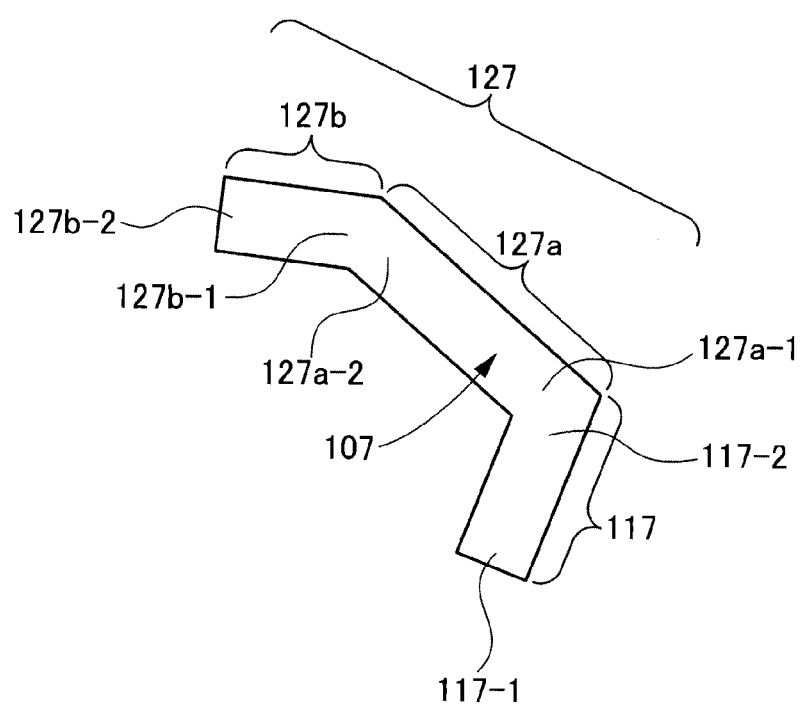
FIG. 2 is a block diagram showing a magnetic shielding portion of Example 1.

Explaining the shape and the configuration of the magnetic shielding portion 107 with reference to FIG. 2, the magnetic shielding portion 107 is constituted of a main body portion 117 and an extending portion 127 succeeding to (communicating with) the main body portion 117. Moreover, the extending portion 127 is constituted of a first extending portion 127a, and a second extending portion 127b.

The main body 117 is formed at a position opposing a q axis side end surface 105q, which is an end surface of the permanent magnet 105 in the peripheral direction. An axial core side portion 117-1 of the main body portion 117 contacts the q-axis end surface 105q, of the permanent magnet 105, succeeds to (communicates with) the permanent magnet inserting hole 104, and extends towards the outer peripheral surface of the rotor 101 (rotor core 102) while being substantially parallel to the d axis. However, an outer peripheral side portion 117-2 of the main body portion 117 does not reach the outer peripheral surface of the rotor 101, and the rotor core 102 resides between the outer peripheral side portion 117-2 and the outer peripheral surface of the rotor 101.

The extending portion 127 is formed closer to the outer peripheral side of the outer peripheral side magnetic pole surface 105ou, of the permanent magnet 105 as well as at a position between the d axis and the q axis. The extending portion 127 is constituted of a linearly extending first extending portion 127a, and a linearly extending second extending portion 127b, succeeding to (communicating with) the first extending portion 127a, in a bent state. The rotor core 102 resides between the extending portion 127 and the outer peripheral surface of the rotor 101.

The first extending portion 127a is arranged in that its base end portion 127a-1 succeeds to (communicates with) the outer peripheral side portion 117-2 of the main body portion 117 and extends from the q axis side towards the d axis side with the outer peripheral side portion 117-2 of the main body portion 117 being the starting point.

Further, the first extending portion 127a comes gradually closer to the outer peripheral surface of the rotor 101 (rotor core 102) in extending towards the d axis side. That is, a distance between the first extending portion 127a and the outer peripheral surface of the rotor 101 (rotor core 102) (distance in the radial direction) becomes gradually smaller with the first extending portion 127a extending towards the d axis.

The second extending portion 127b, is arranged in that its base end portion 127b-1 succeeds to (communicates with) a tip end portion 127a-2 of the first extending portion 127a, and extends from the q axis side towards the d axis side with the tip end portion 127a-2 of the first extending portion 127a, being the starting point. However, a tip end portion 127b-2 of the second extending portion 127b, does not reach the d axis.

Further, the second extending portion 127b, gradually separates from the outer peripheral surface of the rotor 101 (rotor core 102) in extending towards the d axis. That is, a distance between the second extending portion 127b, and the outer peripheral surface of the rotor 101 (rotor core 102) (distance in the radial direction) becomes gradually longer with the second extending portion 127b, extending towards the d axis.

Since the magnetic shielding portion 107 constituted of the main body portion 117 and the extending portion 127 (first and second extending portions 127a,, 127b) is a hole (space), its magnetic permeability is remarkably smaller than that of the rotor core 102, and since it is extremely hard for the magnetic flux to pass therethrough, it functions as a magnetic shielding portion. In this respect, also when the interior of the hole (space) forming the magnetic shielding portion 107 is filled with a non-magnetic metal of low magnetic permeability (such as aluminum or brass), adhesive, varnish or resin, it is still a magnetic shielding portion.

Since such a magnetic shielding portion 107 is formed on both sides of the permanent magnet 105 in the peripheral direction, the rotor 101 of the permanent magnet recited in Example 1, has the following effects.

(1) In the rotor core 102, the distance between the second extending portion 127b, and the outer peripheral surface of the rotor 101 (distance in the radial direction) becomes gradually longer with the second extending portion 127b, extending towards the d axis, and the distance between the second extending portion 127b, and the outer peripheral surface of the rotor 101 (distance in the radial direction) is longest at the tip end portion 127b-2 of the second extending portion 127b.

Therefore, as indicated by the distribution of lines of magnetic force in FIG. 1, at a portion between the second extending portion 127b, and the outer peripheral surface of the rotor 101 out of the rotor core 102 between the magnetic shielding portion 107 and the outer peripheral surface of the rotor 101, magnetic saturation increases moderately from the central axial side towards the end portion side of the main magnetic pole in the peripheral direction. As a result, the distribution range of magnetic flux generated from the outer peripheral side magnetic pole surface 105ou, of the permanent magnet 105 goes round the magnetic shielding portions 107 and reaches the surface of the rotor 101 towards the end portion side of the main magnetic pole in the peripheral direction becomes longer when compared to the prior art in which the second extending portion 127b, is not provided.

Therefore, changes in magnetic flux density distribution generated on the outer peripheral surface of the rotor 101, and more specifically, changes in magnetic flux density distribution at both end portions of the main magnetic pole in the peripheral direction will become more moderate by means of the permanent magnet 105 when compared to the prior art in which the second extending portion 127b, is not provided.

As a result, changes in magnetic flux density distribution of magnetic flux generated from the main magnetic pole will be closer to a sine wave shape, and it is possible to reduce cogging torque and torque ripples in a more effective manner.

(2) At the base end portion 127a-1 of the first extending portion 127a, or the tip end portion 127b-2 of the second extending portion 127b, the distance between the extending portion 127 and the outer peripheral surface of the rotor 101 (distance in the radial direction) is longer.

It is accordingly possible to improve the mechanical strength at the rotor core 102 between the extending portion 127 and the outer peripheral surface of the rotor 101 even when the length of the extending portion 127 in the peripheral direction is long such that it can stand centrifugal force and external shock or the like.

Further, in performing punching of the silicon steel plates for forming the rotor core 102, there will be no fear of deformation or cutting of the rotor core 102 positioned between the extending portion 127 and the outer peripheral surface of the rotor 101 so that punching can be easily performed at the time of manufacturing the rotor core 102.

(3) The rotor core 102 is arranged in that the distance between the extending portion 127 and the outer peripheral surface of the rotor 101 (distance in the radial direction) is smaller at the tip end portion 127a-2 of the first extending portion 127a, or the base end portion 127b-1 of the second extending portion 127b, and the length of the extending portion 127 in the peripheral direction is longer. Since the magnetic resistance of the rotor core 102 becomes accordingly longer between the extending portion 127 and the outer peripheral surface of the rotor 101, it is possible to reduce short-circuit flux and to effectively generate magnetic torque.

(4) As indicated by the following equation (1), reluctance torque is generated by a difference in d axis inductance and q axis inductance.

In the present example, by providing the extending portion 127 extending in the peripheral direction to be closer to the outer peripheral side than the outer peripheral side magnetic pole surface 105ou, of the permanent magnet 105, the inductance of the d axis becomes small (since magnetic flux becomes harder to pass through) and the difference between the d axis inductance and the q axis inductance becomes large ($L_d<L_q$) so that the reluctance torque (torque of the second item of equation (1)) can be effectively used.

$$T=P_n\Phi_m i_q+P_n(L_d-L_q)i_d i_q \quad (1)$$

T: torque
$P_n$: number of poles
$\Phi_m$: magnetic flux of permanent magnet
$i_q$: q axis current
$i_d$: d axis current
$L_q$: q axis inductance
$L_d$: d axis inductance

EXAMPLE 2

Figure 3:
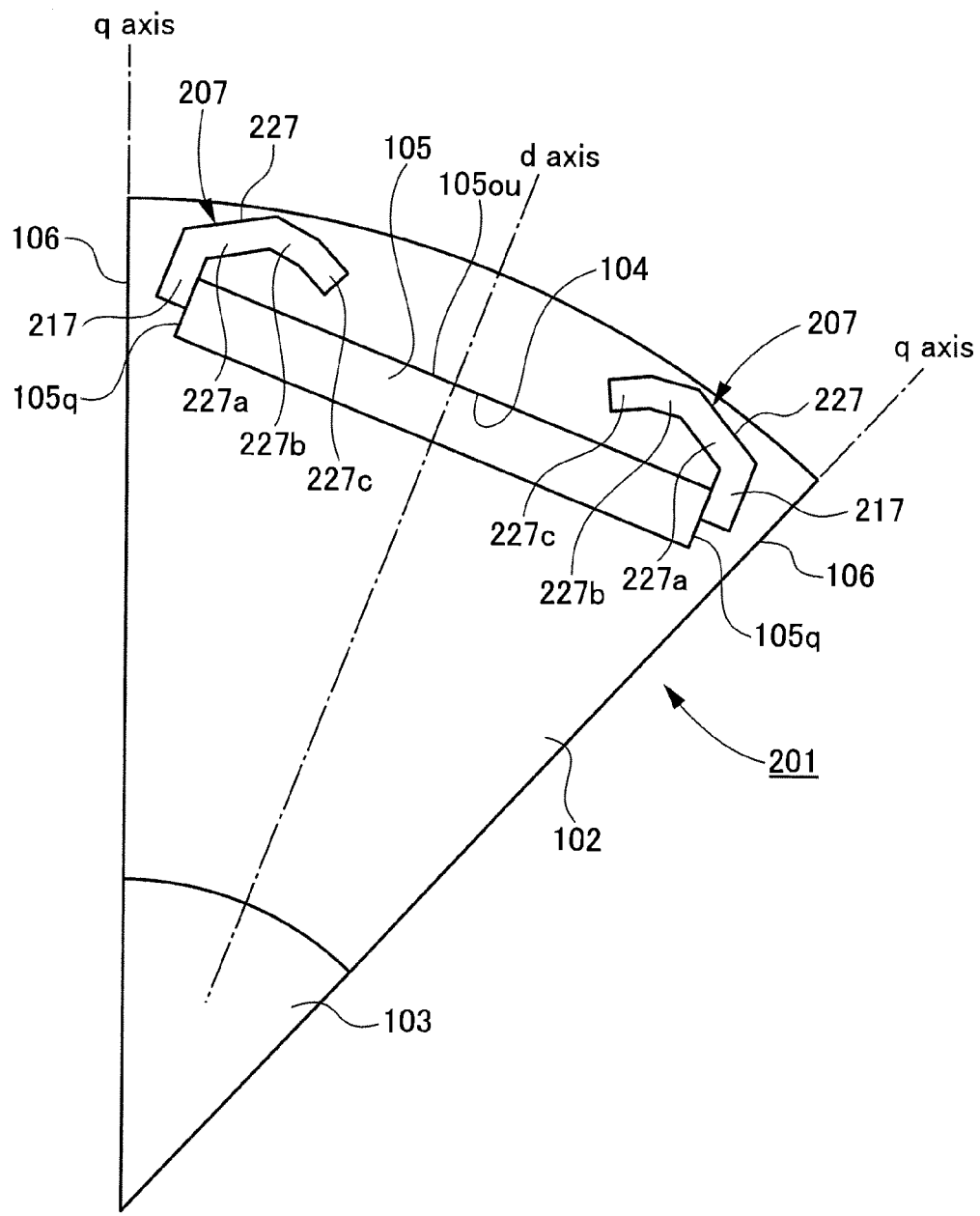
FIG. 3 is a sectional view orthogonal to an axial direction showing a rotor of a permanent magnet motor according to Example 2, of the present invention.

Next, a rotor 201 of a permanent magnet motor according to Example 2, of the present invention will be explained with reference to FIG. 3. In this respect, portions identical to those of Example 1, are marked with the same reference signs, and explanations of duplicated portions will be omitted.

In the rotor 201 of Example 2, a magnetic shielding portion 207 is constituted of a main body portion 217 and an extending portion 227 succeeding to (communicating with) the main body portion 217.

The main body portion 217 is formed at a position opposing the q axis side end surface 105q, of the permanent magnet 105. The main body portion 217 contacts an end surface of the permanent magnet 105 in the peripheral direction, succeeds to (communicates with) the permanent magnet inserting hole 104, and extends towards the outer peripheral surface of the rotor 201 (rotor core 102) while being substantially parallel to the d axis.

An extending portion 227 is formed closer to the outer peripheral side than the outer peripheral side magnetic pole surface 105ou, of the permanent magnet 105 and at a position between the d axis and the q axis. The extending portion 227 is constituted of a linearly extending first extending portion 227a, a second extending portion 227b, extending linearly while succeeding to (communicating with) the first extending portion 227a, in a bent manner, and a third extending portion 227c, extending linearly while succeeding to (communicating with) the second extending portion 227b, in a bent manner. Namely, the extending portion 227 bents in a two-staged manner.

The first extending portion 227a, gradually comes closer to the outer peripheral surface of the rotor 201 (rotor core 102) in extending from the q axis side towards the d axis side.

The second extending portion 227b, gradually separates from the outer peripheral surface of the rotor 201 (rotor core 102) in extending from the q axis side towards the d axis side, and the third extending portion 227c, gradually separates from the outer peripheral surface of the rotor 201 (rotor core 102) in extending from the q axis side towards the d axis side. Moreover, the interval of the third extending portion 227c, separating from the outer peripheral surface of the rotor 201 (rotor core 102) in extending from the q axis side to the d axis side of the third extending portion 227c, (distance in the radial direction) is longer than that of the second extending portion 227b.

Since the extending portion 227 is bent in a two-staged manner in the rotor 201 of a permanent magnet motor of Example 2, the magnetic saturation increases in a more moderate manner from the central axis side towards the end portion side of the main magnetic pole in the peripheral direction at a portion of the rotor core 102 between the second extending portion 227b or the third extending portion 227c and the outer peripheral surface of the rotor 201 by adjusting respective lengths and bending angles of the extending portions 227a, 227b and 227c. As a result, it is possible to adjust the distribution range of the magnetic flux which is generated from the outer peripheral side magnetic pole surface 105ou of the permanent magnet 105, going round the magnetic shielding portion 207 and reaching the surface of the rotor 201 towards the end portion side of the main magnetic pole in the peripheral direction when compared to Example 1 in which no portion corresponding to the third extending portion 227c is provided.

It is accordingly possible to make, by means of the permanent magnet 105, changes in magnetic flux density distribution generated on the outer peripheral surface of the rotor 201, and particularly changes in magnetic flux density distribution of both end portions of the main magnetic pole in the peripheral direction to be even more moderate when compared to Example 1 in which no portion corresponding to the third extending portion 227c is provided.

As a result, by making the magnetic flux density distribution of magnetic flux generated from the main magnetic pole come close to a sine wave shape, it is possible to further reduce cogging torque or torque ripples.

It is also possible to exhibit the same effects as those obtained in Example 1.

In this respect, the bending in the extending portion 227 is not limited to the above-described two-staged one but might also be one of three or more stages.

EXAMPLE 3

Figure 4:
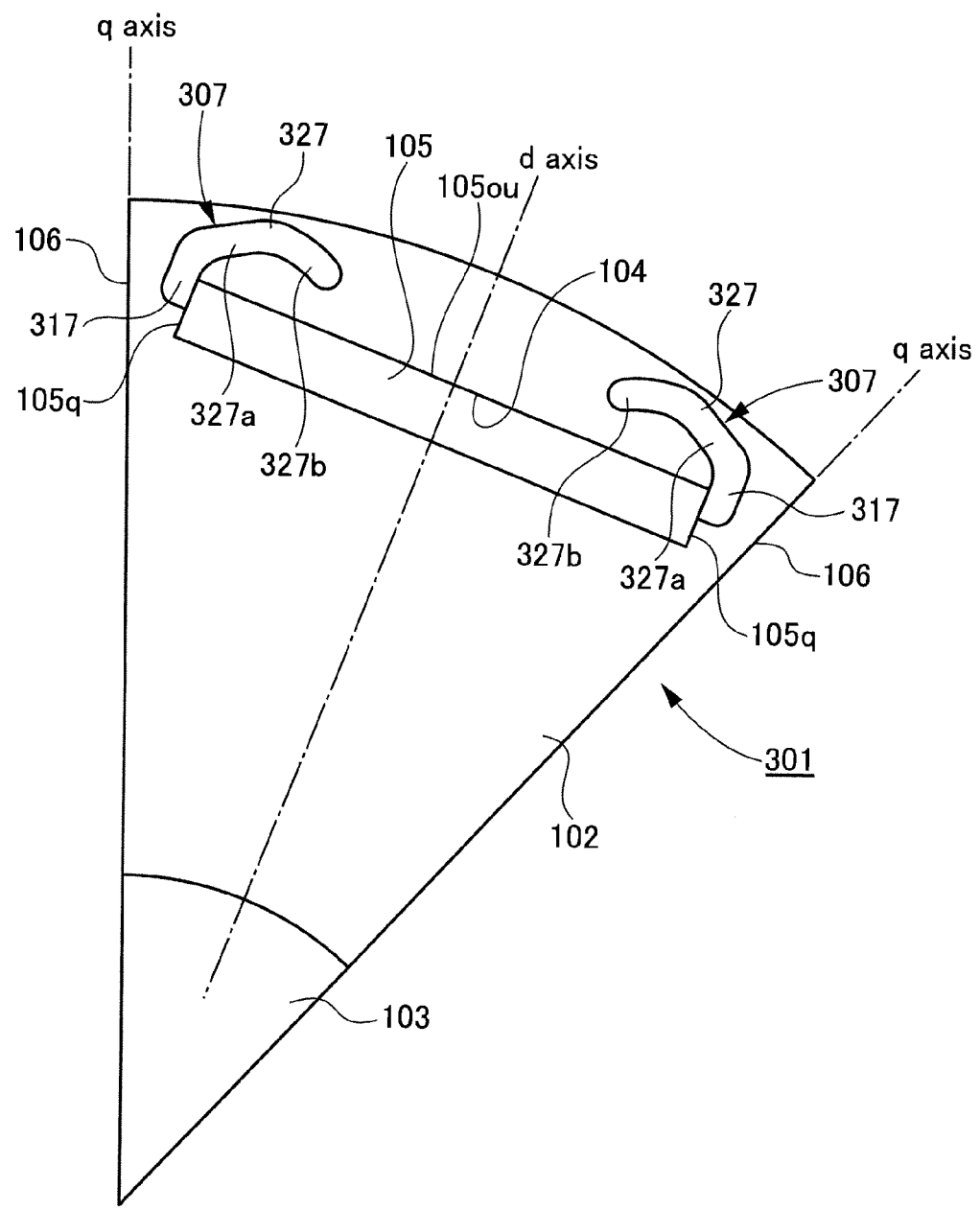
FIG. 4 is a sectional view orthogonal to an axial direction showing a rotor of a permanent magnet motor according to Example 3, of the present invention.

Next, a rotor 301 of a permanent magnet motor according to Example 3, of the present invention will be explained with reference to FIG. 4. In this respect, portions identical to those of Example 1, are marked with the same reference signs, and explanations of duplicated portions will be omitted.

In the rotor 301 of Example 3,, a magnetic shielding portion 307 is constituted of a main body portion 317 and an extending portion 327 succeeding to (communicating with) the main body portion 317.

The main body portion 317 is formed at a position opposing the q axis side end surface 105q, of the permanent magnet 105. The main body portion 317 contacts the q axis side end surface 105q, of the permanent magnet 105 (succeeds to (communicates with) the permanent magnet inserting hole 104) and extends towards the outer peripheral surface of the rotor 301 (rotor core 102) while being substantially parallel to the d axis.

An extending portion 327 is formed closer to the outer peripheral side than the outer peripheral side magnetic pole surface 105ou, of the permanent magnet 105 and at a position between the d axis and the q axis. The extending portion 327 is constituted of a first extending portion 327a, having an arc shape which is convex with respect to the outer peripheral surface of the rotor 301 (rotor core 102) and extending in a warped manner, and a second extending portion 327b, extending while succeeding to (communicating with) the first extending portion 327a, in a warped manner.

The first extending portion 327a, gradually comes closer to the outer peripheral surface of the rotor 301 (rotor core 102) in extending from the q axis side towards the d axis side.

On the other hand, the second extending portion 327b, gradually separates from the outer peripheral surface of the rotor 301 (rotor core 102) in extending from the q axis side towards the d axis side.

Since the extending portion 327 is warped in arc shape in the rotor 301 of a permanent magnet motor of Example 3, it is possible to avoid that mechanical stress focuses at corner portions formed at boundaries of each of the extending portions so as to further increase mechanical strength.

It is also possible to exhibit the same effects as those obtained in Example 1.

EXAMPLE 4

Figure 5:
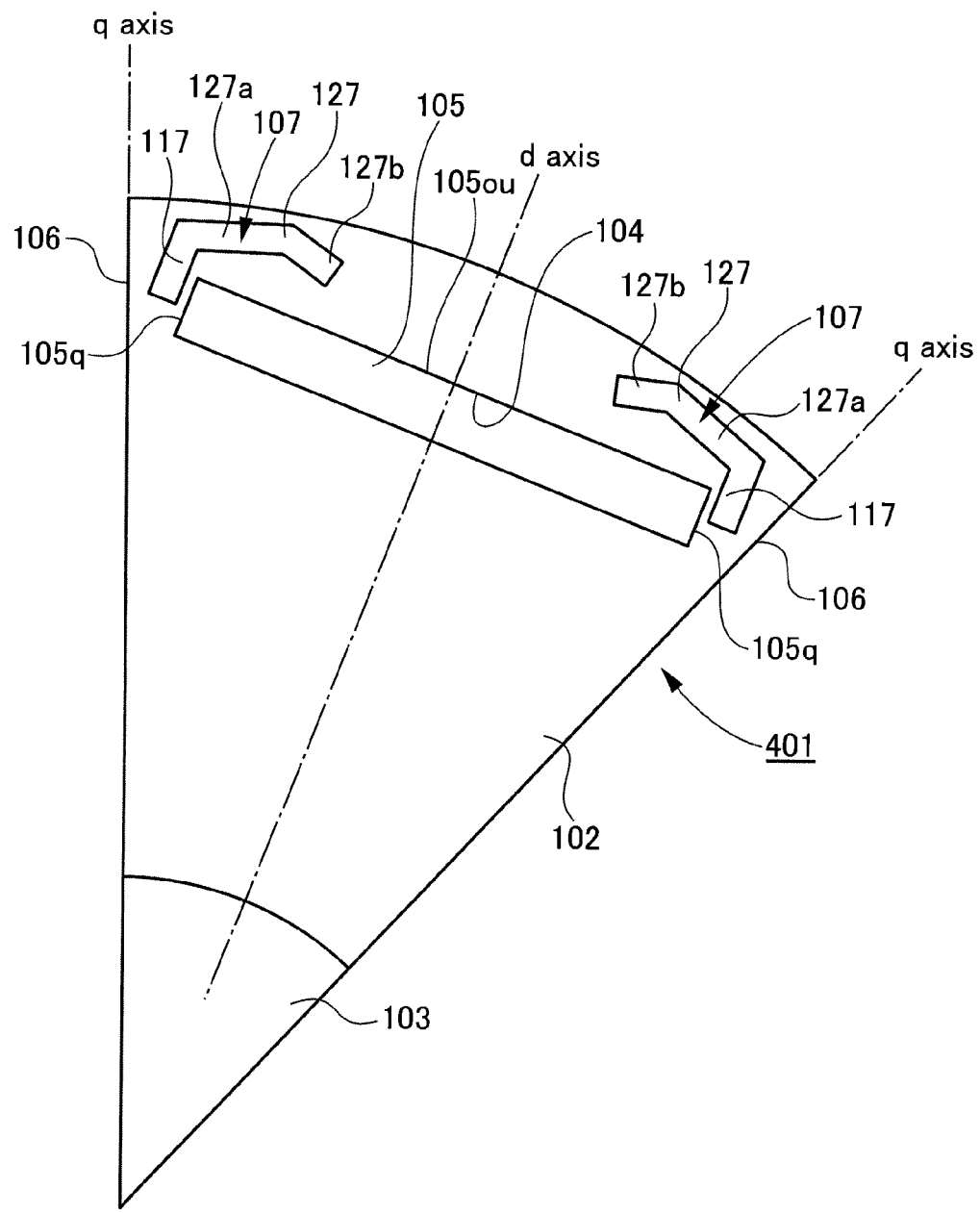
FIG. 5 is a sectional view orthogonal to an axial direction showing a rotor of a permanent magnet motor according to Example 4, of the present invention.

Next, a rotor 401 of a permanent magnet motor according to Example 4, of the present invention will be explained with reference to FIG. 5. In this respect, portions identical to those of Example 1, are marked with the same reference signs, and explanations of duplicated portions will be omitted.

In the rotor 401 of Example 4, the magnetic shielding portion 107 is constituted of the main body portion 117 and the extending portion 127 succeeding to (communicating with) the main body portion 117. Moreover, the extending portion 127 is constituted of the first extending portion 127a, and the second extending portion 127b. Namely, the shape of the magnetic shielding portion 107 itself is identical to that of Example 1.

However, while the main body 117 of the magnetic shielding portion 107 is formed at a position opposing a q axis side end surface 105q, of a permanent magnet 105, it is disposed while being apart from the q axis side end surface 105q, of the permanent magnet 105 in the peripheral direction.

It is possible to exhibit the same effects as those obtained in Example 1, also with the rotor 401 of a permanent magnet motor of Example 4.

EXAMPLE 5

Figure 6:
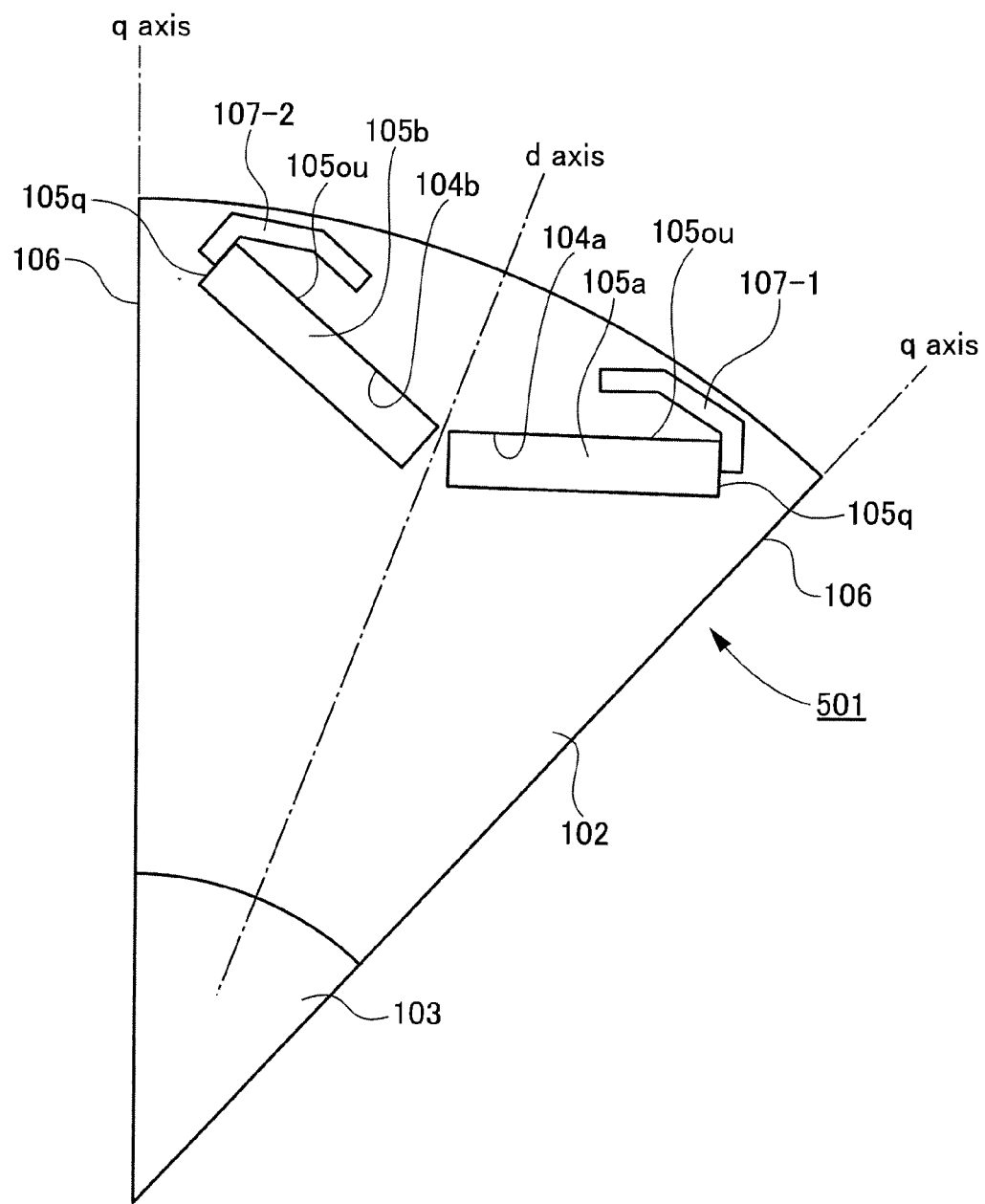
FIG. 6 is a sectional view orthogonal to an axial direction showing a rotor of a permanent magnet motor according to Example 5, of the present invention.

Next, a rotor 501 of a permanent magnet motor according to Example 5, of the present invention will be explained with reference to FIG. 6. In this respect, portions identical to those of Example 1, are marked with the same reference signs, and explanations of duplicated portions will be omitted.

In the rotor 501 of Example 5, one main magnetic pole is formed with two permanent magnet inserting holes 104a,, 104b. The permanent magnet inserting holes 104a,, 104b, are line symmetric with the center being the d axis when seen from an end surface of the rotor 501 and become wider in extending from an axial core side of the rotor 501 towards an outer peripheral surface side of the rotor 501 so that the permanent magnet inserting holes 104a,, 104b, have a so-called "V-shaped" form.

Permanent magnets 105a,, 105b, are inserted into each of the permanent magnet inserting holes 104a,, 104b,, and the state of disposing the permanent magnets 105a,, 105b, is also of "V-shaped" form.

At this time, outer peripheral side magnetic pole surfaces 105ou, of both permanent magnets 105a,, 105b, are of identical magnetic polarity (S pole or N pole). With this arrangement, the permanent magnets 105a,, 105b, form one main magnetic pole.

The permanent magnet 105a, is positioned on one side of the main magnetic pole in the peripheral direction (clockwise direction). A magnetic shielding portion 107-1 is formed on an end surface side of the one permanent magnet 105a, in the clockwise direction.

The magnetic shielding portion 107-1 includes a main body portion 117-1 and an extending portion 127-1.

The main body 117-1 contacts an end surface of the permanent magnet 105a, in the clockwise direction and succeeds to (communicates with) the magnet inserting hole 104a. The main body portion 117-1 extends towards the outer peripheral surface of the rotor core 102 in a state in which it inclines towards the d axis. However, an outer peripheral side portion of the main body portion 117-1 does not reach the outer peripheral surface of the rotor 501 (rotor core 102). The rotor core 102 resides between the main body portion 117-1 and the outer peripheral surface of the rotor 501.

The extending portion 127-1 is arranged in that its base portion (portion of the q axis side) succeeds to (communicates with) the outer peripheral side portion of the main body portion 117-1 and extends along the outer peripheral surface of the rotor core 102 from the q axis side towards the d axis side with the outer peripheral side portion of the main body portion 117-1 being the starting point and gradually separates from the outer peripheral surface of the rotor core 102 while further extending from the q axis side towards the d axis side. The rotor core 102 resides between the extending portion 127-1 and the rotor 501.

The permanent magnet 105*b*, is positioned on the other side of the main magnetic pole in the peripheral direction (counterclockwise direction). A magnetic shielding portion 107-2 is formed on an end surface side of the other permanent magnet 105*b*, in the counterclockwise direction.

The magnetic shielding portion 107-2 includes a main body portion 117-2 and an extending portion 127-2.

The main body portion 117-2 contacts an end surface of the permanent magnet 105*b*, in the counterclockwise direction and succeeds to (communicates with) the magnet inserting hole 104*b*. The main body portion 117-2 extends towards the outer peripheral surface of the rotor core 102 in a state in which it inclines towards the d axis. However, an outer peripheral side portion of the main body portion 117-2 does not reach the outer peripheral surface of the rotor 501 (rotor core 102). The rotor core 102 resides between the main body portion 117-2 and the outer peripheral surface of the rotor 501.

The extending portion 127-2 is arranged in that its base portion (portion of the q axis side) succeeds to (communicates with) the outer peripheral side portion of the main body portion 117-2 and extends along the outer peripheral surface of the rotor core 102 from the q axis side towards the d axis side with the outer peripheral side portion of the main body portion 117-1 being the starting point and gradually separates from the outer peripheral surface of the rotor core 102 while further extending from the q axis side towards the d axis side. The rotor core 102 resides between the extending portion 127-2 and the rotor 501.

It is possible to exhibit the same effects as those obtained in Example 1, also with the rotor 501 of a permanent magnet motor of Example 5.

In this respect, the state of disposing the permanent magnets is not limited to the above-described "V-shaped" form, and the same effects as those of Example 1, can be obtained also with "reversed V-shaped", "U-shaped", "arch-like" or "trapezoid" forms.

EXAMPLE 6

Figure 7:
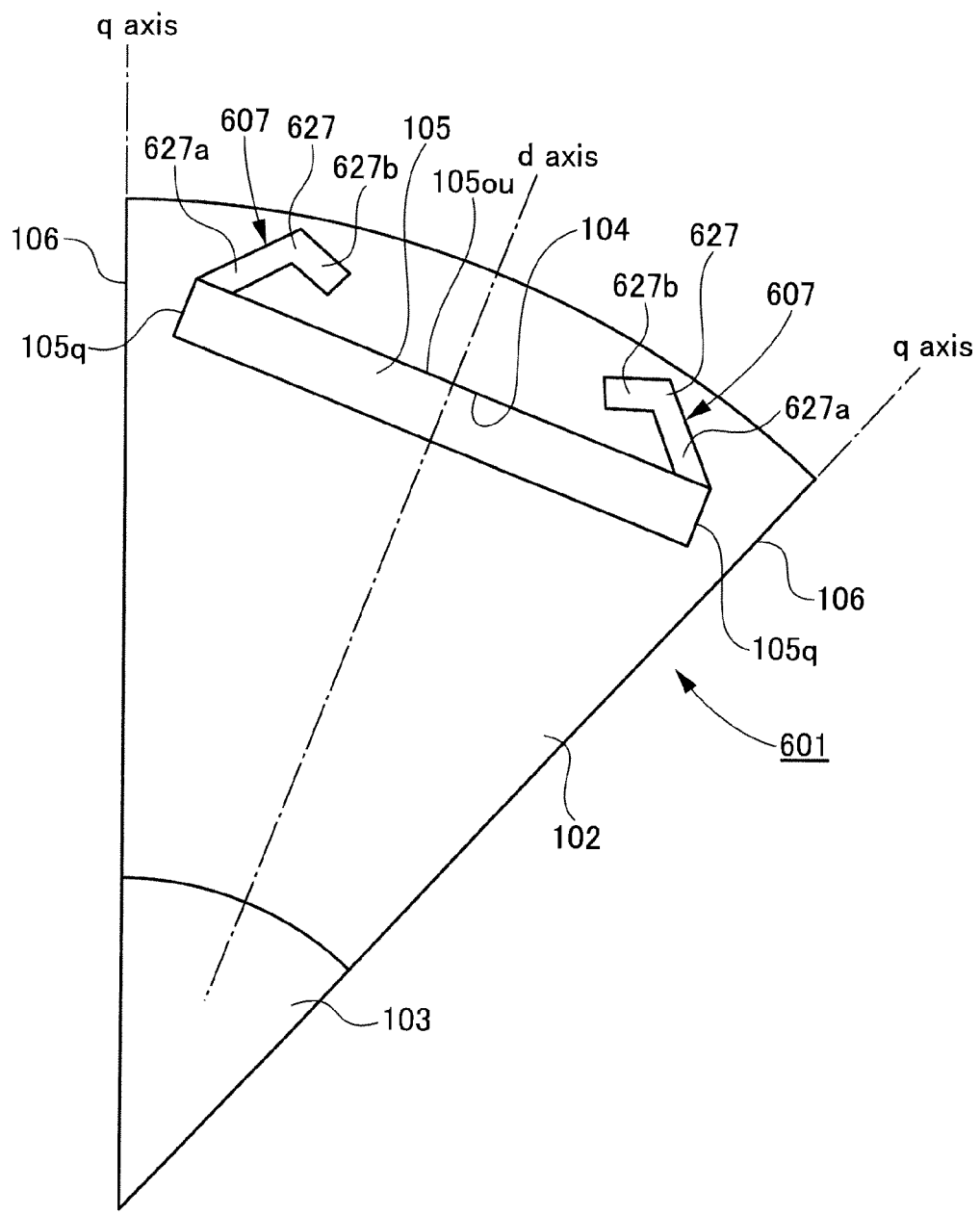
FIG. 7 is a sectional view orthogonal to an axial direction showing a rotor of a permanent magnet motor according to Example 6, of the present invention.
Figure 8:
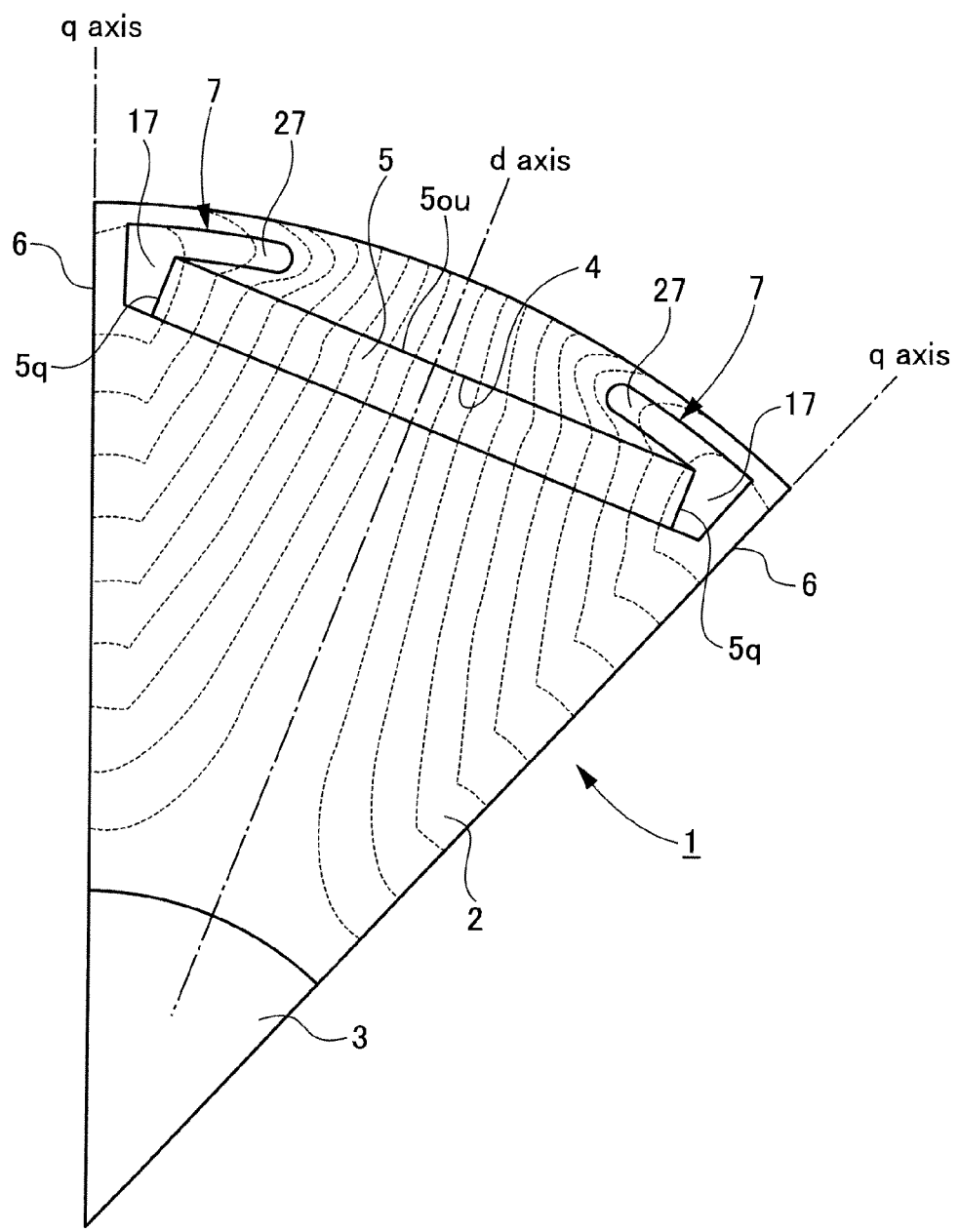
FIG. 8 is a sectional view orthogonal to an axial direction showing a rotor of a permanent magnet motor according to the prior art.
Figure 9:
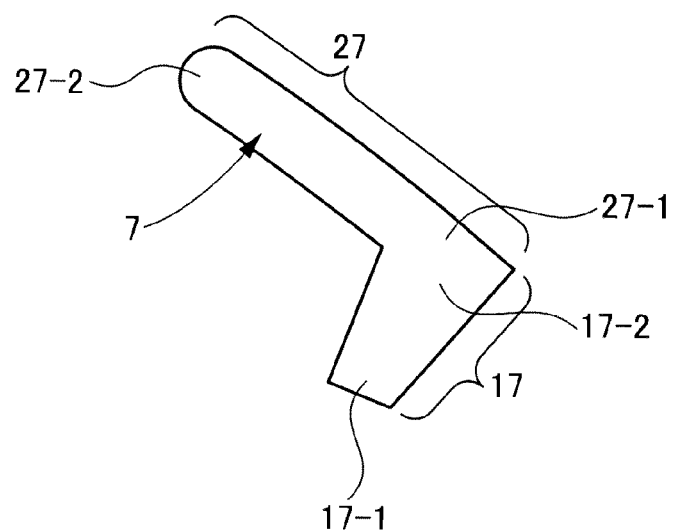
FIG. 9 is a block diagram showing a conventional magnetic shielding portion in extracted and enlarged view.

Next, a rotor 601 of a permanent magnet motor according to Example 6, of the present invention will be explained with reference to FIG. 7. In this respect, portions identical to those of Example 1, are marked with the same reference signs, and explanations of duplicated portions will be omitted.

In the rotor 601 of Example 6, a magnetic shielding portion 607 is constituted of an extending portion 627 and does not comprise a main body portion unlike the above-described examples. The extending portion 627 is constituted of a first extending portion 627*a*, and a second extending portion 627*b*, succeeding to (communicating with) the first extending portion 627*a*, in a bent condition.

The first extending portion 627*a* extends linearly from the q axis side towards the d axis side with a portion close to a q axis side end surface 105*q* of the permanent magnet 105 from among the outer peripheral side magnetic pole surface 105*ou* of the permanent magnet 105 being a starting point and comes gradually closer to the outer peripheral surface of the rotor 601 (rotor core 102) in extending.

The second extending portion 627*b*, extends linearly from the q axis side towards the d axis side with a tip end portion of the first extending portion 627*a*, being a starting point and gradually separates from the outer peripheral surface of the rotor 601 (rotor core 102) in extending.

It is possible to exhibit the same effects as those obtained in Example 1 also with the rotor 601 of Example 6.

In this respect, while the extending portion 627 of Example 6 has an overall bent shape, it could also have an overall warped shape.

Further, in Example 6, while the first extending portion 627*a* of the extending portion 627 contacts the outer peripheral side magnetic pole surface 105*ou*, it is also possible to form the extending portion 627 such that the first extending portion 627*a* separates from the outer peripheral side magnetic pole surface 105*ou*, is closer to the outer peripheral side than the outer peripheral surface magnetic pole surface 105*ou* and is positioned between the d axis and the q axis.

In this respect, while a single permanent magnet is inserted into one permanent magnet inserting hole in the above-described examples, the permanent magnets which are inserted into the permanent magnet inserting holes are not limited to single magnets but might be divided in any one of the axial direction, radial direction or peripheral direction.

In the above examples, while magnetic shielding portions are formed on both sides of a single main magnetic pole in the peripheral direction, it is possible to reduce cogging torque and torque ripples by forming the magnetic shielding portion only on one side of a single main magnetic pole in the peripheral direction.

REFERENCE SIGNS LIST

1, 101, 201, 301, 401, 501, 601 . . . rotor
2, 102 . . . rotor core
3, 103 . . . motor shaft
4, 104, 104*a*,, 104*b*, . . . permanent magnet inserting hole
5, 105, 105*a*,, 105*b*, . . . permanent magnet
105*ou*, . . . outer peripheral side magnetic pole surface
105*q*, . . . q axis side end surface
6, 106 . . . auxiliary magnetic pole
7, 107, 107-1, 107-2, 207, 307, 607 . . . magnetic shielding portion
117, 217, 317 . . . main body portion
117-1 . . . axial core side portion
117-2 . . . outer peripheral side portion
127, 227, 627 . . . extending portion
127*a*,, 227*a*,, 327*a*,, 627*a*, . . . first extending portion
127*a*-1 . . . base end portion
127*a*-2 . . . tip end portion
127*b*,, 227*b*,, 327*b*,, 627*b*, . . . second extending portion
127*b*-1 . . . base end portion
127*b*-2 . . . tip end portion
227*c*, . . . third extending portion

The invention claimed is:

1. A rotor of a permanent magnetic motor formed with a plurality of main magnetic poles along a peripheral direction of a rotor core by respectively comprising permanent magnets in permanent magnet inserting holes formed at a plurality of spots in a peripheral direction of the rotor core to penetrate in an axial direction from one end surface up to the other end surface of the rotor core, and formed with magnetic shielding portions for each main magnetic pole which penetrate in the axial direction from the one end surface up to the other end surface of the rotor core and which are positioned between a d axis and a q axis of a d-q axial coordinate on the end surface of the rotor core, wherein each magnetic shielding portion includes a main body portion and an extending portion succeeding to the main body portion, wherein the main body portion is formed at a position opposing a q axis side end surface of the permanent magnet, wherein the main body portion also extends towards an outer peripheral surface of the rotor core, wherein the extending portion is formed closer to an outer peripheral side than an outer peripheral side magnetic pole surface of the permanent magnet, wherein the extending portion is also constituted of a first extending portion which gradually approaches the outer peripheral surface of the rotor core while extending from the q axis side towards the d axis side with the outer peripheral side portion of the main body portion being the starting point and a second extending portion extending further from a tip end portion of the first extending portion from the q axis side towards the d axis side, and wherein an outer peripheral side surface of the second extending portion positioned on the outer peripheral side of the rotor core and an inner peripheral side surface of the second extending portion positioned on the inner peripheral side of the rotor core and opposing the outer peripheral side surface gradually separate from the outer peripheral surface of the rotor core from the q axis side towards the d axis side.

2. The rotor of a permanent magnet motor according to claim 1, wherein the second extending portion is warped while extending further from a tip end portion of the first extending portion from the q axis side towards the d axis side.

3. The rotor of a permanent magnet motor according to claim 1, wherein the main body portion contacts the q axis side end surface of the permanent magnet.

4. The rotor of a permanent magnet motor according to claim 1, wherein the main body portion separates from the q axis side end surface of the permanent magnet.

5. A rotor of a permanent magnetic motor formed with a plurality of main magnetic poles along a peripheral direction of a rotor core by respectively comprising permanent magnets in permanent magnet inserting holes formed at a plurality of spots in a peripheral direction of the rotor core to penetrate in an axial direction from one end surface up to the other end surface of the rotor core, and formed with magnetic shielding portions for each main magnetic pole which penetrate in the axial direction from the one end surface up to the other end surface of the rotor core and which are positioned between a d axis and a q axis of a d-q axial coordinate on the end surface of the rotor core, wherein each magnetic shielding portion includes a main body portion and an extending portion succeeding to the main body portion, wherein the main body portion is formed at a position opposing a q axis side end surface of the permanent magnet, wherein the main body portion also extends towards an outer peripheral surface of the rotor core, wherein the extending portion is formed closer to an outer peripheral side than an outer peripheral side magnetic pole surface of the permanent magnet, and wherein the extending portion is also constituted of a first extending portion which gradually approaches the outer peripheral surface of the rotor core while extending from the q axis side towards the d axis side with the outer peripheral side portion of the main body portion being the starting point and a second extending portion gradually separating from the outer peripheral surface of the rotor core while extending further from a tip end portion of the first extending portion from the q axis side towards the d axis side at a constant width.

6. The rotor of a permanent magnet motor according to claim 5, wherein the second extending portion is warped while extending further from a tip end portion of the first extending portion from the q axis side towards the d axis side.

7. A rotor of a permanent magnetic motor formed with a plurality of main magnetic poles along a peripheral direction of a rotor core by respectively comprising permanent magnets in permanent magnet inserting holes formed at a plurality of spots in a peripheral direction of the rotor core to penetrate in an axial direction from one end surface up to the other end surface of the rotor core, and formed with magnetic shielding portions for each main magnetic pole which penetrate in the axial direction from the one end surface up to the other end surface of the rotor core and which are positioned between a d axis and a q axis of a d-q axial coordinate on the end surface of the rotor core, wherein each magnetic shielding portion includes a main body portion and an extending portion succeeding to the main body portion, wherein the main body portion is formed at a position opposing a q axis side end surface of the permanent magnet, wherein the main body portion also extends towards an outer peripheral surface of the rotor core, wherein the extending portion is formed closer to an outer peripheral side than an outer peripheral side magnetic pole surface of the permanent magnet, wherein the extending portion is also constituted of a first extending portion which gradually approaches the outer peripheral surface of the rotor core while extending from the q axis side towards the d axis side with the outer peripheral side portion of the main body portion being the starting point and a second extending portion gradually separating from the outer peripheral surface of the rotor core while extending further from a tip end portion of the first extending portion from the q axis side towards the d axis side, and wherein the extending portion has a bent shape being bent halfway while extending from the q axis side towards the d axis side.

* * * * *